US012640657B2

(12) United States Patent
    Solanki

(10) Patent No.: US 12,640,657 B2
(45) Date of Patent: May 26, 2026

(54) MULTI-PHASE DC/DC CONVERTER

(71) Applicant: Delta Electronics (Thailand) Public Co., Ltd., Samutprakarn (TH)

(72) Inventor: Jitendra Solanki, Soest (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 179 days.

(21) Appl. No.: 18/424,895

(22) Filed: Jan. 29, 2024

(65) Prior Publication Data

US 2024/0283368 A1 Aug. 22, 2024

(30) Foreign Application Priority Data

Feb. 22, 2023 (EP) ..................................... 23157968

(51) Int. Cl.
    H02M 3/335 (2006.01)
(52) U.S. Cl.
    CPC ............................... H02M 3/33584 (2013.01)
(58) Field of Classification Search
    CPC ......... H02M 3/33584; H02M 3/33573; H02M 3/33538; H02M 3/335
    See application file for complete search history.

(56) References Cited

U.S. PATENT DOCUMENTS

| | | | | |
|---|---|---|---|---|
| 10,873,265 B2 * | 12/2020 | Xue | .................. | H02M 3/33584 |
| 11,233,462 B2 | 1/2022 | Lu et al. | | |
| 11,404,967 B2 | 8/2022 | Fei et al. | | |
| 2020/0204079 A1 * | 6/2020 | Guo | ....................... | H02M 3/285 |

| | | | | |
|---|---|---|---|---|
| 2023/0291320 A1 * | 9/2023 | Wallmeier | ........ | H02M 3/33573 |
| 2025/0132686 A1 * | 4/2025 | Huber | ................. | H02M 5/2932 |
| 2025/0286468 A1 * | 9/2025 | Solanki | .............. | H02M 1/0043 |

FOREIGN PATENT DOCUMENTS

| | | |
|---|---|---|
| EP | 2887523 A1 | 6/2015 |
| EP | 3675340 A1 | 7/2020 |
| JP | 2021153382 A | 9/2021 |
| WO | 2011074977 A2 | 6/2011 |

OTHER PUBLICATIONS

Akif Zia Khan et al, A Three-Phase Dual-Active-Bridge DC-DC Converter With Reconfigurable Resonant Network for Efficient Wide Voltage Range Operation, IEEE Transactions on Power Electronics, vol. 35, No. 2, Feb. 2020.
Extended European search report of EP 23157968.1 issued on Jul. 17, 2023.

* cited by examiner

*Primary Examiner* — Adolf D Berhane
(74) *Attorney, Agent, or Firm* — CKC & Partners Co., LLC

(57) ABSTRACT

The application concerns a multi-phase DC/DC-converter, comprising a primary side switching circuit comprising a plurality of primary side switching legs, where each primary side switching leg comprises two or more switch elements; at least one secondary side rectifier circuit each including a plurality of secondary side rectifier legs, where each secondary side rectifier leg includes two or more rectifier elements; a transformer, where the transformer includes a primary side connected to the primary side switching circuit and a secondary side connected to each of the at least one secondary side rectifier circuit; and at least one resonant capacitor network, each connected to the primary side or to the secondary side of the transformer, where each resonant capacitor network includes a plurality of capacitors.

19 Claims, 12 Drawing Sheets

11/13

MULTI-PHASE DC/DC CONVERTER

CROSS-REFERENCE TO RELATED APPLICATIONS

This application claims priority to European Patent Application No. 23157968.1, filed on Feb. 22, 2023, and entitled "MULTI-PHASE DC/DC CONVERTER CIRCUIT", the content of which is hereby incorporated by reference in its entirety.

TECHNICAL FIELD

The present application concerns a multi-phase DC/DC converter.

BACKGROUND

Traditionally, power converters, especially DC/DC (direct current to direct current) power converters are known. Examples of conventional transformer devices are known from for example U.S. Ser. No. 11/404,967 B2, WO 2011/074977, U.S. Ser. No. 11/233,462 B2 and JP 2021153382.

Traditionally, 1-phase LLC converters are used in applications of up to 11 kW of power rating for DC-DC power conversion. For higher power requirements, traditionally 3-phase LLC topologies have been used. These are commonly known as 3-phase unidirectional LLC or 3-phase bidirectional CLLLC topologies.

However, the commonly known transformer topologies have the following drawbacks. Firstly, winding losses thereof are proportional to a square of the current and winding resistance. Resistance of the winding is proportional to the frequency of operation. In order to reduce the size of such converters, operation frequency is commonly increased. However, increased frequency leads to increased resistance and thus to higher losses and heat. Due to efficiency requirements and thermal constraints, converters generally are designed to achieve a tradeoff between size (power density), efficiency and cost with respect to amount of semiconductor and magnetic materials. Therefore, commonly, smaller size and higher efficiency thereof are commonly not simultaneously possible.

Furthermore, a voltage gain (ratio of output and input voltage) of the converter is dependent on an operating frequency thereof (gain curve). The gain curve of an LLC converter is fixed based on circuit parameters such as transformer turns ratio, resonant inductor, magnetizing inductance, and resonant capacitance. In application such as battery charging, a battery voltage varies widely based on a state of charge of the battery. In common converters for such applications, the converter operates in a frequency control mode with limited capability to meet wide voltage variation criteria of the battery and simultaneously reduce tradeoffs such as converter losses. Common 2-stage converters for overcoming such limitations are however costly and are also prone to high power losses. In particular, common LLC converters are operated at different operating frequencies so as to provide the necessary gain depending on for example a state of charge of batteries. With this, however, such converters are commonly operated not at or near resonant frequency, and are therefore prone to high losses.

In addition, as stated above, unidirectional and bidirectional 3-phase LLC topologies are known. Such bidirectional 3-phase topologies are for example implemented in modern automotive battery charging applications, in which the automobiles batteries are also used for example in powering a home. However, it is commonly not possible to provide a bidirectional LLC topology which has optimal gain characteristics and high efficiency for both current directions (i.e. charging and discharging, also referred to as "forward operation", "backward operation"). Furthermore, especially in such applications, the charging of the batteries of the automobile makes up a high percentage of the use of the converter, whereas the use of the batteries for example in powering the home is not as common. Therefore, common bidirectional topologies tradeoff high efficiency charging for an expansion of use-cases in applications, even though such use cases and applications are not often employed over the lifetime of these devices.

SUMMARY

It is thus an object of the present application to provide a multi-phase DC/DC converter which does not have the foregoing explained disadvantages. In particular, one object of the present application is to provide a multi-phase DC/DC converter which has a small size (high power density) and has reduced losses (higher efficiency). Furthermore, it is an object of the present application to provide a multi-phase DC/DC converter which can advantageously be operated at or near resonant frequency independent of voltage gain requirements. Furthermore, it is an object of the present application to provide a multi-phase DC/DC converter which provides high energy-efficiency for both unidirectional and bidirectional applications.

The solution of these objects is especially achieved by the multi-phase DC/DC converter of the present application. The multi-phase DC/DC converter includes a primary side switching circuit including a plurality of primary side switching legs, where each primary side switching leg includes two or more switch elements. Further, the multi-phase DC/DC converter includes at least one secondary side rectifier circuit each including a plurality of secondary side rectifier legs, where each secondary side rectifier leg includes two or more rectifier elements. Furthermore, the converter includes a transformer, where the transformer includes a primary side connected to the primary side switching circuit and a secondary side connected to each of the at least one secondary side rectifier circuit. In addition, the converter includes at least one resonant capacitor network, each connected to the primary side or to the secondary side of the transformer, where each resonant capacitor network includes a plurality of capacitors.

In an embodiment of the present application, each primary side switching leg includes two switch elements. Advantageously, the switch elements are IGBTs or MOSFETs.

In an embodiment of the present application, each secondary side rectifier leg includes two rectifier elements.

In an embodiment of the present application, the converter is provided with one resonant capacitor network connected to the primary side of the transformer. Therein, the converter preferably includes only one resonant capacitor network connected to the primary side as well as at least one resonant capacitor network connected to the secondary side of the transformer. Alternatively, the transformer includes only one resonant capacitor network connected to the primary side, and especially no further resonant capacitor networks either on the primary side or on the secondary side of the transformer.

In an embodiment of the present application, the converter includes one resonant capacitor network connected to the secondary side of the transformer. Therein, the converter preferably includes one resonant capacitor network connected to the secondary side of the transformer as well as at least one resonant capacitor network connected to the primary side of the transformer. Alternatively, the converter includes only one resonant capacitor network connected to the secondary side of the transformer and no further resonant capacitor networks connected to the primary side or to the secondary side of the transformer.

In an embodiment of the present application, the converter includes more than one resonant capacitor network on one of or both the primary side or the secondary side of the transformer.

In an embodiment of the present application, at least one of the resonant capacitor network includes a switching unit configured to switch connections of the capacitors of the resonant capacitor network between at least two connection configurations.

In an embodiment of the present application, the at least two connection configurations include different gain curves at different frequencies.

In an embodiment of the present application, the at least two connection configurations include different circuit parameters of at least a resonance inductance and/or a resonance capacitance.

In an embodiment of the present application, the at least two connection configurations are chosen from: a star configuration, a double star configuration, a hexagonal configuration and a double delta configuration.

In an embodiment of the present application, the at least one resonant capacitor network includes two different connection configurations out of the double star configuration, the hexagonal configuration, and the double delta configuration, and the switching unit is configured to switch between said two connection configurations.

In an embodiment of the present application, the at least one resonant capacitor network includes two configurations out of the foregoing configurations, in an embodiment, out of the double star configuration, the hexagonal configuration, and the double delta configuration, and the switching unit is configured to switch between said two configurations. Herein, preferably, each of the at least one resonant capacitor network includes the two configurations. In other words, one resonant capacitor network includes two configurations.

In an embodiment of the present application, each of the at least one resonant capacitor network is respectively connected between the primary side switching circuit and the primary side of the transformer. Alternatively, each of the at least one resonant capacitor network is respectively connected between the respective secondary side rectifier circuit and the secondary side of the transformer. Preferably, none of the at least one resonant capacitor network(s) is connected to both the primary side and the secondary side of the transformer. In other words, preferably none of the at least one resonant capacitor network(s) is connected between the primary side switching circuit and the primary side of the transformer and simultaneously between the respective secondary side rectifier circuit and the secondary side of the transformer.

In an embodiment of the present application, the multi-phase DC/DC converter is unidirectional, and the two or more rectifier elements are diodes; and the resonant capacitor network is connected between the primary side switching circuit and the primary side of the transformer.

Alternatively, the multi-phase DC/DC converter is preferably bidirectional. Therein, the rectifier elements are preferably switching elements, preferably MOSFETs or IGBTs. And the two or more rectifier elements are switching elements, and where the multi-phase DC/DC-converter includes a first resonant capacitor network connected between the primary side switching circuit and the primary side of the transformer, and a second resonant capacitor network connected between the respective secondary side rectifier circuit and the secondary side of the transformer.

In an embodiment of the present application, the switch units of the first resonant capacitor network and the second resonant capacitor network are configured to switch the connection configurations independently from each other.

Herein, although a bidirectional configuration principally also includes a unidirectional configuration in the sense that it can be operated only in forward mode, the term "bidirectional configuration" is to be understood as "principally allowing forward and backward operation". In contrast, "unidirectional configuration" is to be understood as "principally allowing only forward operation". In other words, "unidirectional" may also be understood as "non-bidirectional", and "bidirectional" may also be understood as "non-unidirectional".

In an embodiment of the present application, the multi-phase DC/DC converter includes a plurality of secondary side rectifier circuits, where each of the secondary side rectifier circuits is connected to a different tapping of windings of the secondary side of the transformer.

In an embodiment of the present application, the tappings are disposed such that a connected turn ratio thereof is different between the tappings. For instance, if the secondary side includes exemplary two windings, and one tapping is locating at an end of both windings, and the other is located between the two windings, the one tapping will be connected to a different turn ratio than the other (for example, half of the turn ratio and the full turn ratio).

In an embodiment of the present application, the multi-phase DC/DC converter further includes a first secondary side rectifier circuit and a second secondary side rectifier circuit, where the rectifier elements of the first secondary side rectifier circuit are switches as and the rectifier elements of the second secondary side rectifier circuit are diodes.

In the embodiment of the multi-phase DC/DC converter including exactly two secondary side rectifier circuits, the multi-phase DC/DC converter includes a first secondary side rectifier circuit and a second secondary side rectifier circuit, which are each preferably connected to different tappings of the secondary winding of the transformer. Therein, the first secondary side rectifier circuit includes switches as rectifier elements and the second secondary side rectifier circuit includes diodes as rectifier elements.

In an embodiment of the present application, the first secondary side rectifier circuit allows a bidirectional operation and/or configuration of the multi-phase DC/DC converter, and the second secondary side rectifier circuit allows a unidirectional operation and/or configuration of the multi-phase DC/DC converter. In other words, preferably, the multi-phase DC/DC converter is preferably simultaneously bidirectional and unidirectional with respect to the secondary side rectifier circuits.

In an embodiment of the present application, the multi-phase DC/DC converter further includes at least one rectifier circuit switching unit connected to the output side of the rectifier elements of one or both of the first secondary side rectifier circuit and the second secondary side rectifier circuit, and the rectifier circuit switching unit is configured to switch between the first secondary side rectifier circuit and the second secondary side rectifier circuits.

In an embodiment of the present application, the at least one rectifier circuit switching unit is thereby configured to switch between a bidirectional operation/configuration and a unidirectional operation/configuration of the multi-phase DC/DC converter. Thereby, the multi-phase DC/DC converter is configured so as to optimally operate in bidirectional or unidirectional operation. For example, if the multi-phase DC/DC converter including the unidirectional secondary side rectifier circuit, the bidirectional secondary side rectifier circuit, as well as the at least one rectifier circuit switching unit is used for charging batteries, the secondary side rectifier circuit switching unit switches to the unidirectional secondary side rectifier circuit, and when using the same batteries for powering other components/appliances (for example powering a home with an automobile battery), the aforementioned rectifier circuit switching unit can switch to the bidirectional secondary side rectifier circuit. Thus, the multi-phase DC/DC converter can be advantageously operated closer to resonance and/or closer to optimal efficiency for different (i.e. both) applications.

In an embodiment of the present application, the multi-phase DC/DC converter further includes, on the secondary side of the transformer, a single resonant capacitor network connected between the secondary side of the transformer and at least one of the plurality of secondary side rectifier circuits.

In an embodiment of the present application, the single resonant capacitor network on the secondary side of the transformer is connected between the secondary side of the transformer and only one of the plurality of secondary side rectifier circuits.

In an embodiment of the present application, the single resonant capacitor network on the secondary side of the transformer is connected between the secondary side of the transformer and a first secondary side rectifier circuit, and where the rectifier elements of the first secondary side rectifier circuit are switches.

In an embodiment of the present application, the single resonant capacitor network includes a switching unit configured to switch connections of the capacitors of the resonant capacitor network between at least two connection configurations.

In an embodiment of the present application, the at least two connection configurations are chosen from: a star configuration, a double star configuration, a hexagonal configuration and a double delta configuration.

In the embodiment of the multi-phase DC/DC converter including two secondary side rectifier circuits (first and second secondary side rectifier circuits), as well as a single resonant capacitor network connected between the secondary side of the transformer and only one of the plurality of secondary side rectifier circuits, said resonant capacitor network is connected between the secondary side of the transformer and the foregoing described first secondary side rectifier circuit. In other words, the resonant capacitor network is preferably connected between the secondary side of the transformer and the secondary side rectifier circuit which includes the switches as rectifier elements (i.e. the bidirectional secondary side rectifier circuit). Preferably, the resonant capacitor network on the secondary side of the transformer is thereby dedicated only for the bidirectional operation of the multi-phase DC/DC converter. Preferably, the resonant capacitor network on the secondary side of the transformer is thereby not dedicated only for the unidirectional operation (via the second secondary side rectifier circuit) of the multi-phase DC/DC converter.

In an embodiment of the present application, the secondary side of the transformer is connected in a delta configuration. Thereby, an occurrence of triplen (3, 6, 9, 12, etc.) harmonics is advantageously reduced or prevented.

In an embodiment of the present application, the multi-phase DC/DC converter is a 6-phase DC/DC converter. Therein, the primary side switching circuit includes six primary side switching legs. Further, the at least one secondary side rectifier circuit, especially each of the at least one secondary side rectifier circuit(s), includes six secondary side rectifier legs.

In an embodiment of the present application, the multi-phase DC/DC converter includes a planar transformer, which includes at least one of integrated primary side resonant inductors and secondary side resonant inductors.

Preferably therein, at least one of the windings, especially all of the windings, of the transformer and of the resonant inductors of the converter are integrated in a printed circuit board (PCB). Preferably therein, the PCB includes openings for the insertion of magnetic core legs of magnetic cores.

BRIEF DESCRIPTION OF DRAWINGS

Further details, advantages, and features of the preferred embodiments of the present application are described in detail with reference to the figures. Therein.

DESCRIPTION OF EMBODIMENTS

Figure 1:
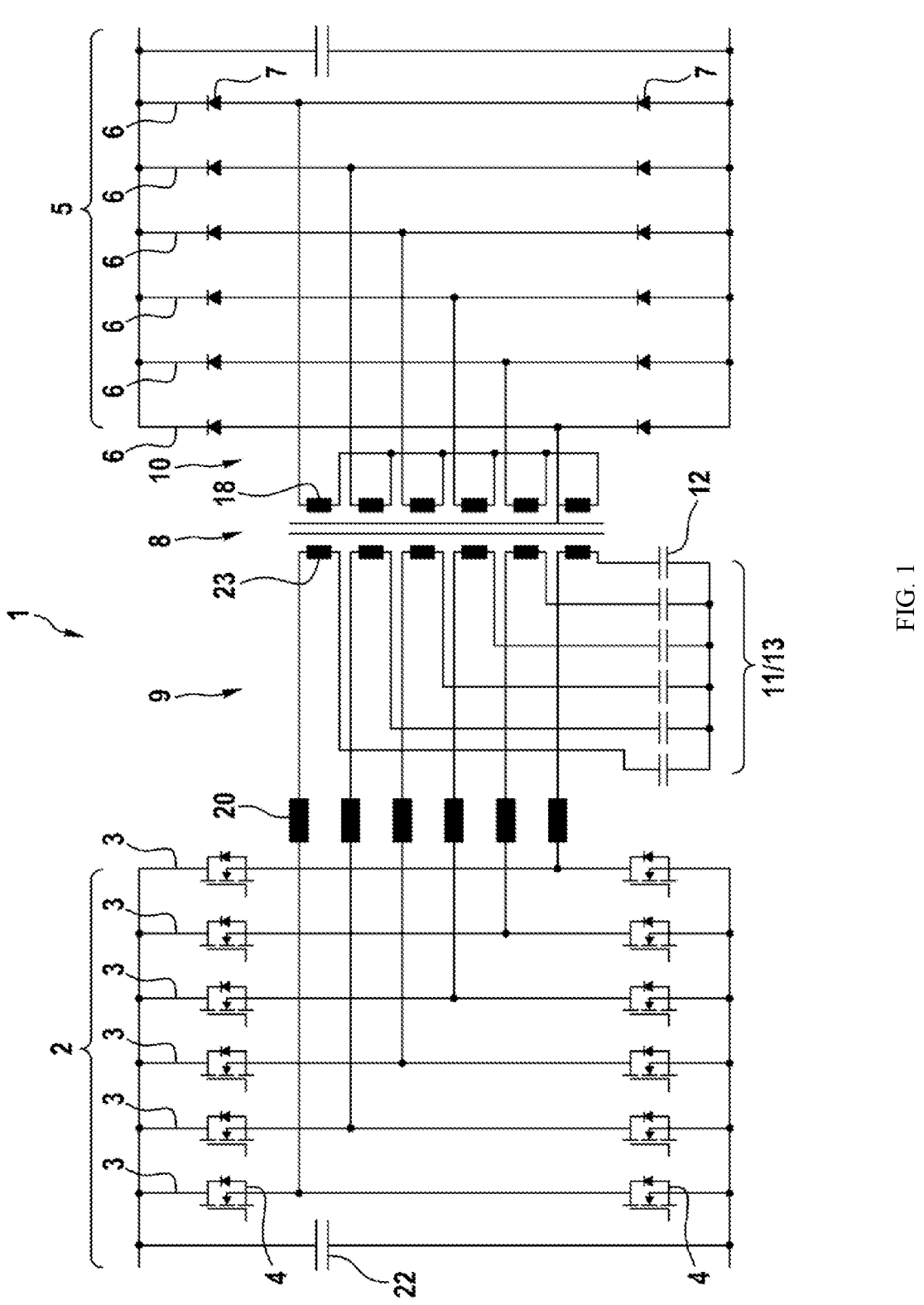
FIG. 1 shows a circuit diagram of a multi-phase DC/DC-converter according to a first embodiment of the present application.

FIG. 1 shows a circuit diagram of a multi-phase DC/DC-converter 1 according to a first embodiment of the present application. Henceforth, unless the number of phases is specified, the following will refer to the "multi-phase DC/DC-converter 1" as "converter 1".

The converter 1 includes a transformer 8 with a primary side 9 and a secondary side 10, a primary side switching circuit 2, and a secondary side rectifier circuit 5. The converter 1 furthermore includes a DC-link capacitor 22 and primary side resonant inductors 20. Thereby, the converter 1 is an LLC converter (also referred to as "LLC topology").

The converter 1 of the present embodiment is a six phase DC/DC-converter. Due to the shown six-phase LLC topology, current through the winding reduces by half as compared to three-phase LLC topologies. Voltage across windings of the transformer 8 also reduces. This leads to reduced losses per winding. Therefore, to achieve size reduction, frequency of operation can be increased. Thus, the six-phase topology results in a smaller transformer 8 by distributing losses across an increased number of windings. Smaller current and high frequency operation can be helpful to design planar transformer (as will be discussed later with respect to FIGS. 12 to 14), which leads to advantageously automated fabrication processes.

The primary side switching circuit 2 includes six primary side switching legs 3. Each of the six primary side switching legs 3 includes two switch elements 4. Therefore, the converter 1 of the present embodiment is a two-level converter 1. The primary side 9 of the transformer 8 includes six windings 23.

The secondary side rectifier circuit 5 includes 6 secondary side rectifier legs 6. Each of the six secondary side rectifier legs 6 includes two rectifier elements 7. The secondary side rectifier circuit 5 is a bridge configuration. The secondary side 10 of the transformer 8 includes six windings 18.

In general, if the rectifier elements 7 of the secondary side rectifier circuit 5 are diodes, as in the case of FIG. 1, then such a converter 1 is referred to as "unidirectional", as transformation is carried out from the primary side 9 to the secondary side 10. On the other hand, as will also be shown in further embodiments, in case the rectifier elements 7 of the secondary side rectifier circuit 5 are switches, then such a converter is referred to as "bidirectional", as transformation can be carried out from the primary side 9 to the secondary side 10 or from the secondary side 10 to the primary side 9. For the sake of higher readability, a left side (in FIG. 1, the actual primary side 9) of the transformer 8 will always be referred to as the primary side 9, even though in a bidirectional case, when current is transformed from right to left (in FIG. 1, from secondary side 10 to primary side 9), their nomenclature would be switched depending on current flow. Furthermore, even though a bidirectional configuration also allows a unidirectional operation, a configuration in which bidirectional transformation is feasible will nonetheless be referred to as bidirectional. In another sense, "unidirectional" may also be understood as "non-bidirectional".

The converter 1 of the present embodiment includes a resonant capacitor network 11. The resonant capacitor network 11 includes a plurality of capacitors 12. Each of the capacitors 12 is connected to the primary winding 23 of the transformer 8 as well as to the primary side resonant inductor 20. A capacitor 12 together with a resonant inductor 20 are commonly referred to as resonant network ("LC" of "LLC", further "L" being winding 23 of transformer 8), as they together form a resonance circuit.

As can be taken from FIG. 1, the capacitors 12 of the resonant capacitor network 11 of the present embodiment include a double star configuration 13 (also referred to as a "double star connection of capacitors"). Such a configuration reduces voltage stress on each capacitor 12.

Figure 2:
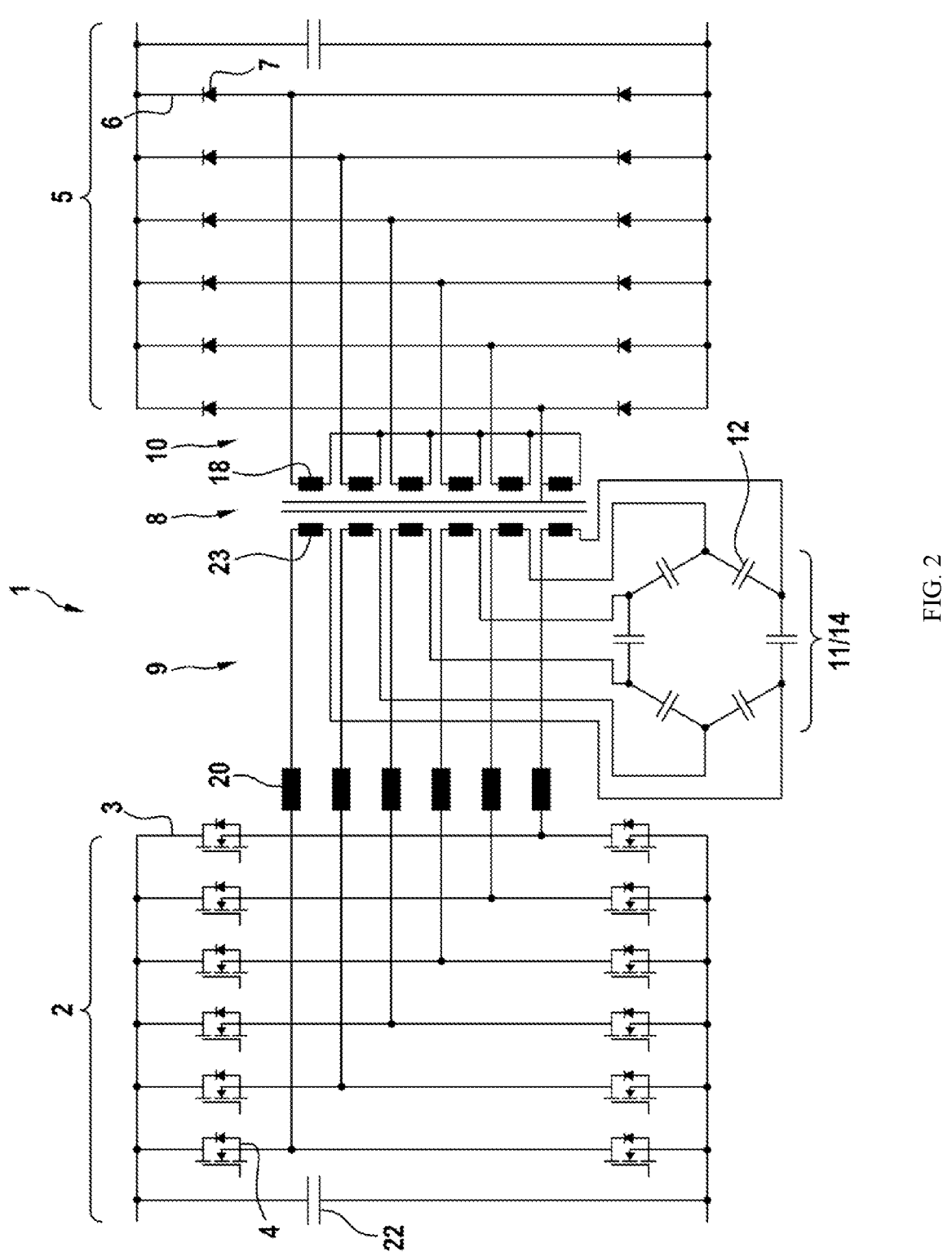
FIG. 2 shows a circuit diagram of a multi-phase DC/DC-converter according to a second embodiment of the present application.

FIG. 2 shows a circuit diagram of a multi-phase DC/DC-converter 1 according to a second embodiment of the present application.

As can be taken from FIG. 2, the capacitors 12 of the resonant capacitor network 11 of the present embodiment include a hexagonal configuration 14 (also referred to as a "hexagonal connection of capacitors"). Such a configuration is an alternative configuration of a delta configuration and achieves lower current stress on each capacitor 12.

Figure 3:
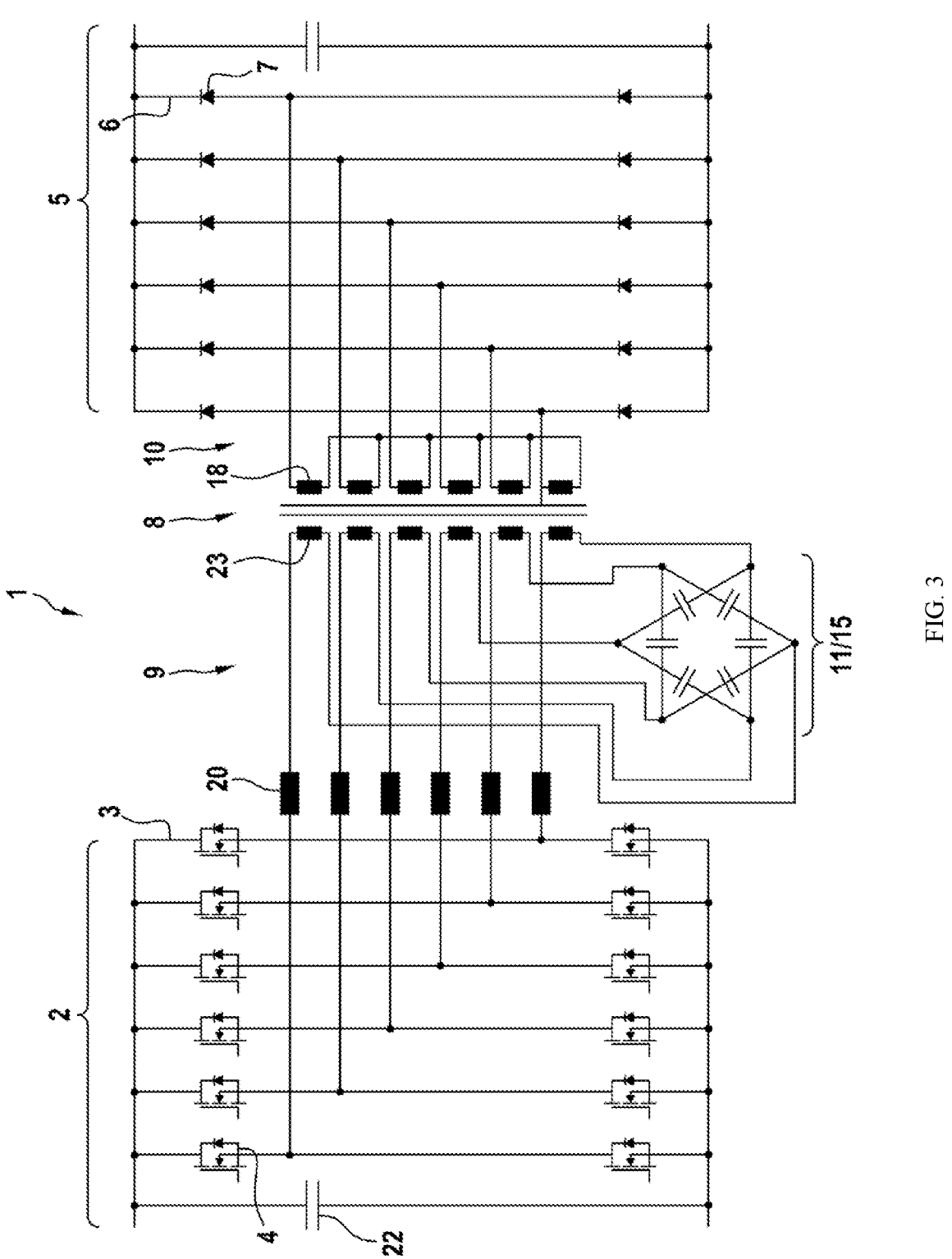
FIG. 3 shows a circuit diagram of a multi-phase DC/DC-converter according to a third embodiment of the present application.

FIG. 3 shows a circuit diagram of a multi-phase DC/DC-converter 1 according to a third embodiment of the present application.

As can be taken from FIG. 3, the capacitors 12 of the resonant capacitor network 11 of the present embodiment include a double delta configuration 15 (also referred to as a "double delta connection of capacitors"). Such a configuration, similar to the hexagonal configuration 14 of FIG. 2, achieves a lower current stress on each capacitor 12.

Figure 4:
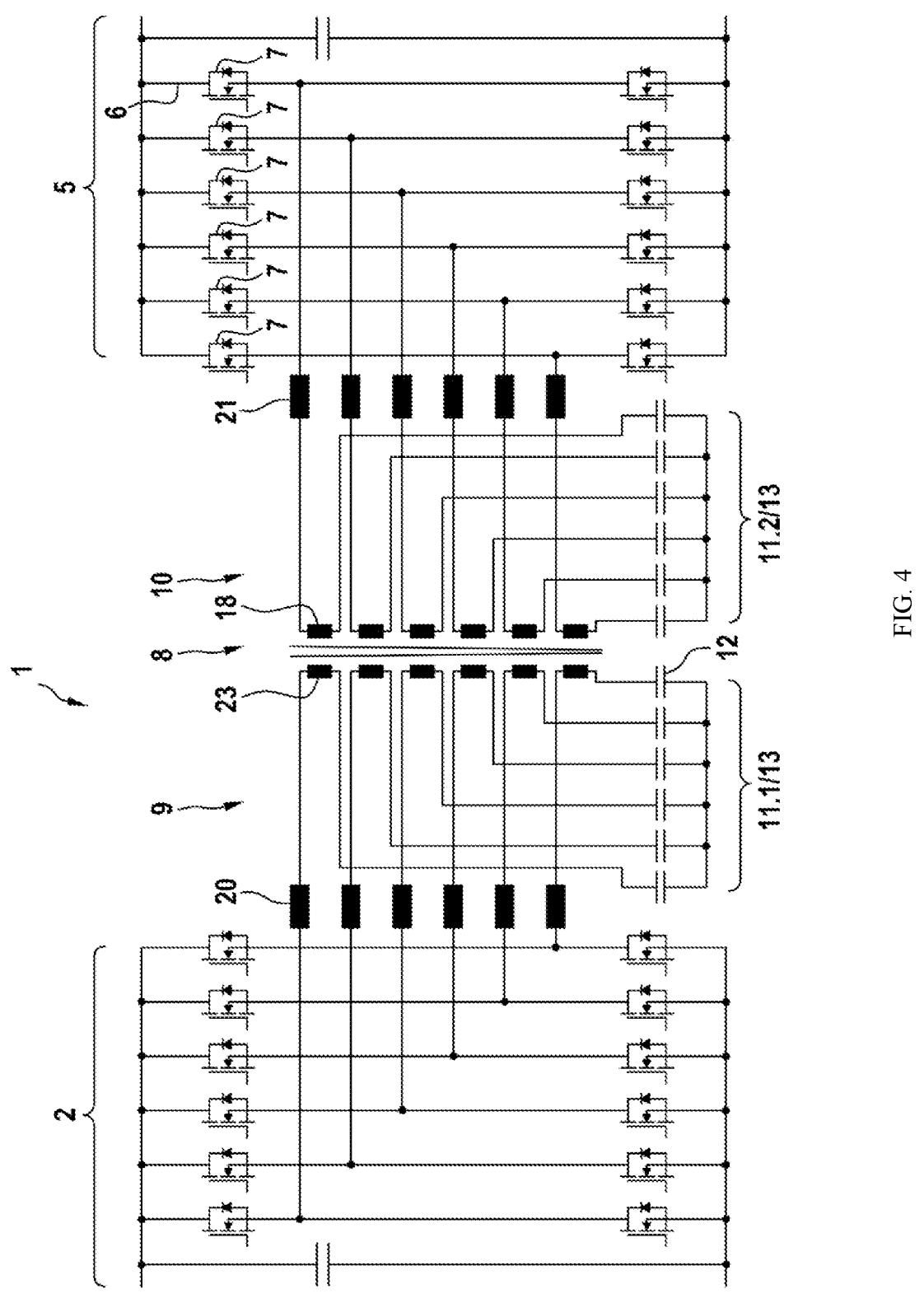
FIG. 4 shows a circuit diagram of a multi-phase DC/DC-converter according to a fourth embodiment of the present application.

FIG. 4 shows a circuit diagram of a multi-phase DC/DC-converter 1 according to a fourth embodiment of the present application.

Herein, as can be seen especially from the switches 7 in the secondary side rectifier circuit 5, the converter 1 is configured to be bidirectional. Therefore, transformation is possible from the primary side 9 to the secondary side 10 and from the secondary side 10 to the primary side 9.

The secondary side 10 of the transformer 8 herein also includes resonant inductors 21 (secondary side resonant inductors 21).

Furthermore, in order to achieve efficient power conversion in both directions, the converter 1 of the present embodiment preferably includes two resonant capacitor networks 11, namely a first resonant capacitor network 11.1 and a second resonant capacitor network 11.2.

In the present embodiment, both the first resonant capacitor network 11.1 and the second resonant capacitor network 11.2 are each a double star configuration 13.

The first resonant capacitor network 11.1 is connected to the primary side 9 of the transformer 8. The second resonant capacitor network 11.2 is connected to the secondary side 10 of the transformer 8. The first resonant capacitor network 11.1 forms, together with the primary side resonant inductors 20, a primary side resonant network. The second resonant capacitor network 11.2 forms, together with the secondary side resonant inductors 21, a secondary side resonant network.

Although in the present embodiment, both resonant capacitor networks 11.1 and 11.2 include the double star configuration 13, both may alternatively include the hexagonal configuration 14 (FIG. 2) or the delta configuration 15 (FIG. 3). Alternatively, the resonant capacitor networks 11.1 and 11.2 may include a combination, i.e. two different, of the foregoing described configurations.

The foregoing described different configurations of resonant capacitor networks 11, 11.1, and 11.2 each have different circuit parameters such as resonance inductance and resonance capacitance. These different circuit parameters essentially lead to different gain curves (voltage gain versus operating frequency) of the converter 1. Depending on the gain needed for the application, for example depending on a voltage level of a battery to be charged by the converter 1, the converter 1 is operated at different frequencies.

Figure 5:
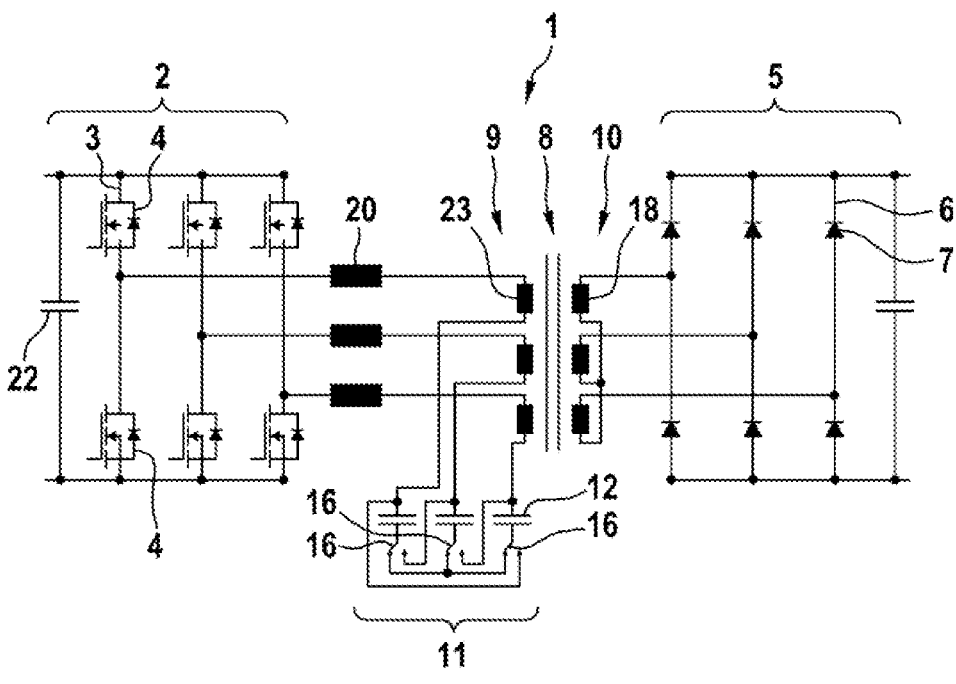
FIG. 5 shows a circuit diagram of a multi-phase DC/DC-converter according to a fifth embodiment of the present application.

FIG. 5 shows a circuit diagram of a multi-phase DC/DC-converter 1 according to a fifth embodiment of the present application.

Herein, the multi-phase DC/DC-converter 1 is a three-phase converter 1, especially in a unidirectional configuration (the secondary side rectifier circuit 5 including diodes as rectifier elements 7). Therefore, the primary side switching circuit 2 includes three primary side switching legs 3, each having two switch elements 4. Further, the converter 1 includes three resonant inductors 20 on the primary side 9. The secondary side rectifier circuit 5 includes three secondary side rectifier legs 6, each having two diodes 7. Furthermore, the transformer 8 includes three primary windings 23 and three secondary windings 18.

Furthermore, the converter 1 of the present embodiment includes one resonant capacitor network 11 connected to the primary side 9 of the transformer 8.

In particular, the resonant capacitor network 11 of the present embodiment includes two configurations of capacitors 12 and switching units 16 (in the present embodiment, three switching units 16), which switch between configurations or connection schemes of the capacitors 12.

In the present embodiment, the resonant capacitor network 11 includes a star configuration and a delta configuration. In the switch-state shown in FIG. 5, the resonant capacitor network 11 is in the star configuration (compare with FIG. 1). If all switching units 16 are switched, the resonant capacitor network 11 will be in the delta configuration (compare with FIG. 3). Thereby, the resonant capacitor network 11 can be switched between star configuration and delta configuration.

The switching of the switching units 16 may be carried out by a control unit (not shown). In particular the control unit may simultaneously control the switching units 16 as well as the primary side switching circuit 2 and/or the secondary side rectifier circuit 5 (for example in the bidirectional case).

The advantage of such a configuration of resonant capacitor network 11 will be described with reference to FIG. 6.

Figure 6:
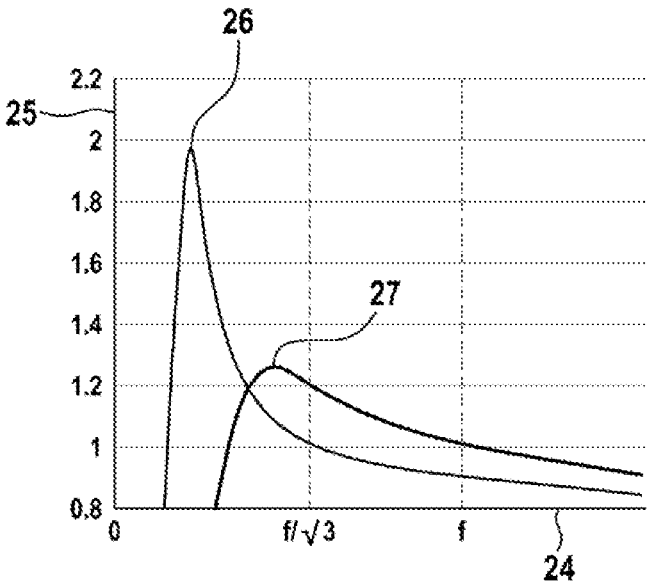
FIG. 6 shows a graph indicating gain curves for the converter shown in FIG. 5.

FIG. 6 shows a graph indicating gain curves for the converter 1 shown in FIG. 5.

Therein, the abscissa 24 of the graph indicates operating frequency of the converter 1, whereas the ordinate 25 of the graph indicates voltage gain. Shown curve 26 is a gain curve 26 of the delta connection (switching units 16 in FIG. 5 being switched to state not shown), whereas shown curve 27 is a gain curve 27 of the star connection (switching units 16 in state as shown in FIG. 5).

Furthermore, in FIG. 6, resonant frequency is indicated by "f". As can be taken from the gain curves 26, 27, each connection scheme has a different gain at different frequencies. If a different gain is required to be supplied from the converter 1, and the required gain is not suppliable (at respectively switched connection scheme) near resonance f, then the switching units 16 may be switched to the different connection scheme so as to supply the required gain closer to resonance f of the converter 1. For example, if a gain of roughly 0.5 is required, the gain curve 26, i.e. delta connection scheme, may be chosen, since it can supply the gain of 0.5 closer to resonance f than the gain curve 27. Alternatively, if a gain of roughly 1 is required, the gain curve 27 may be chosen.

The resonant capacitor network 11 as demonstrated above includes two configurations, herein the star configuration and the delta configuration. However, such a switchable resonant capacitor network 11 is not limited thereto. For instance, such a resonant capacitor network 11 can include a combination of any of the foregoing described configurations. For example, such a resonant capacitor network 11 can include two out of: star, double star, delta, double delta, and hexagonal. Furthermore, the two configurations are preferably different configurations (as is the case with star and delta configurations).

On the other hand, the resonant capacitor network 11 may also include two of the same configurations, for example two delta or double delta configurations, where the capacities of the capacitors 12 and/or the inductance values of the resonant inductors 20 (or respectively on the secondary side: inductances 21) are different, and at least one switching unit 16 switches therebetween.

Figure 7:
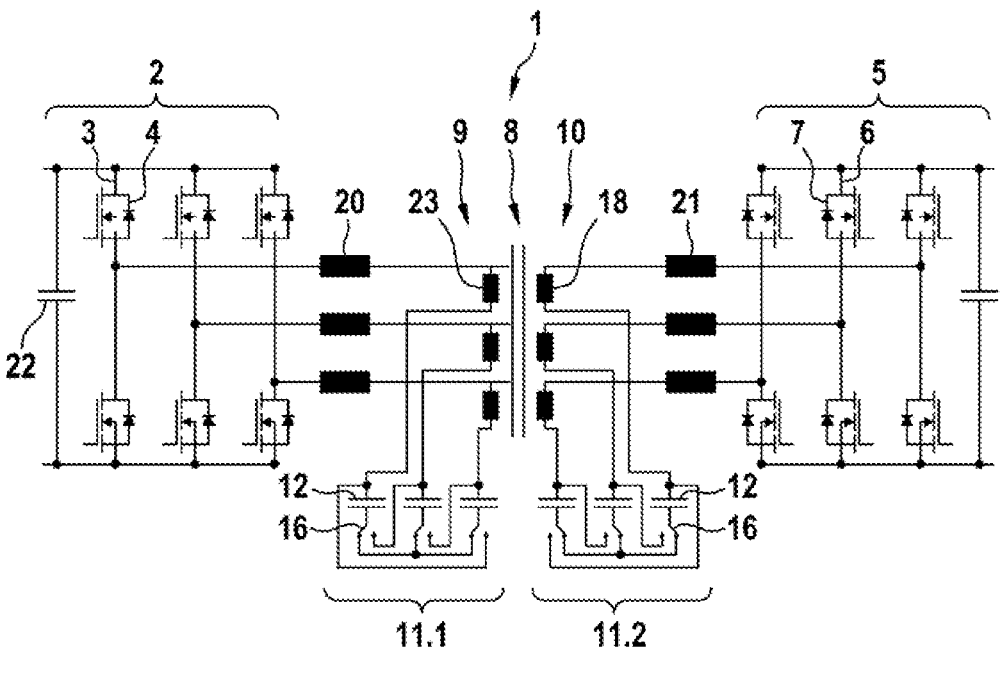
FIG. 7 shows a circuit diagram of a multi-phase DC/DC-converter according to a sixth embodiment of the present application.

FIG. 7 shows a circuit diagram of a multi-phase DC/DC-converter 1 according to a sixth embodiment of the present application.

Herein, the converter 1 is three-phase and bidirectional (switches 7 in secondary side rectifier circuit 5).

Furthermore, as shown in FIG. 7, the converter 1 includes two resonant capacitor networks 11, namely a first resonant capacitor network 11.1 connected to the primary side 9 and a second resonant capacitor network 11.2 connected to the secondary side 10. Herein, both the first resonant capacitor network 11.1 and the second resonant capacitor network 11.2 each include the star configuration and the delta configuration of capacitors 12, with switching units 16 allowing switching therebetween.

Furthermore, although preferably, the resonant capacitor networks 11.1 and 11.2 do not need to be the same, and can each have a configuration as discussed above. Furthermore, their switch-states also do not need to be the same. Instead, they can be switched independently from one another.

Figure 8:
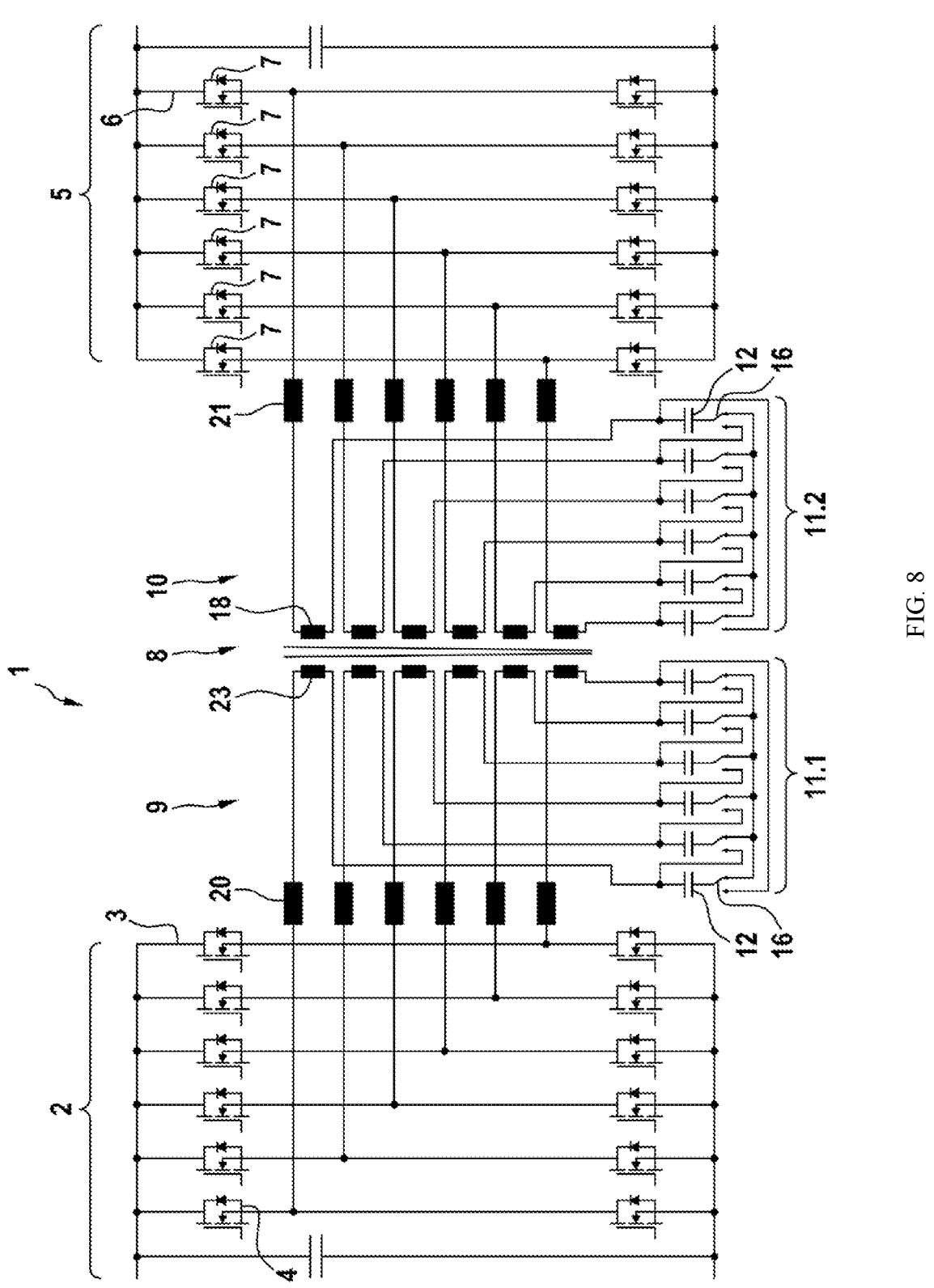
FIG. 8 shows a circuit diagram of a multi-phase DC/DC-converter according to a seventh embodiment of the present application.

FIG. 8 shows a circuit diagram of a multi-phase DC/DC-converter 1 according to a seventh embodiment of the present application.

As can be taken from FIG. 8, the converter 1 of the present embodiment is a six phase converter 1 with a bidirectional configuration. Furthermore, the converter 1 includes the two resonant capacitor networks 11.1 and 11.2. Each of the two resonant capacitor networks 11.1 and 11.2 is switchable between the delta configuration (double delta configuration) and the star configuration.

As discussed above, the resonant capacitor networks 11.1 and 11.2 do not need to be the same, although this is preferable, and also do not need to be switched identical to one another.

Figure 9:
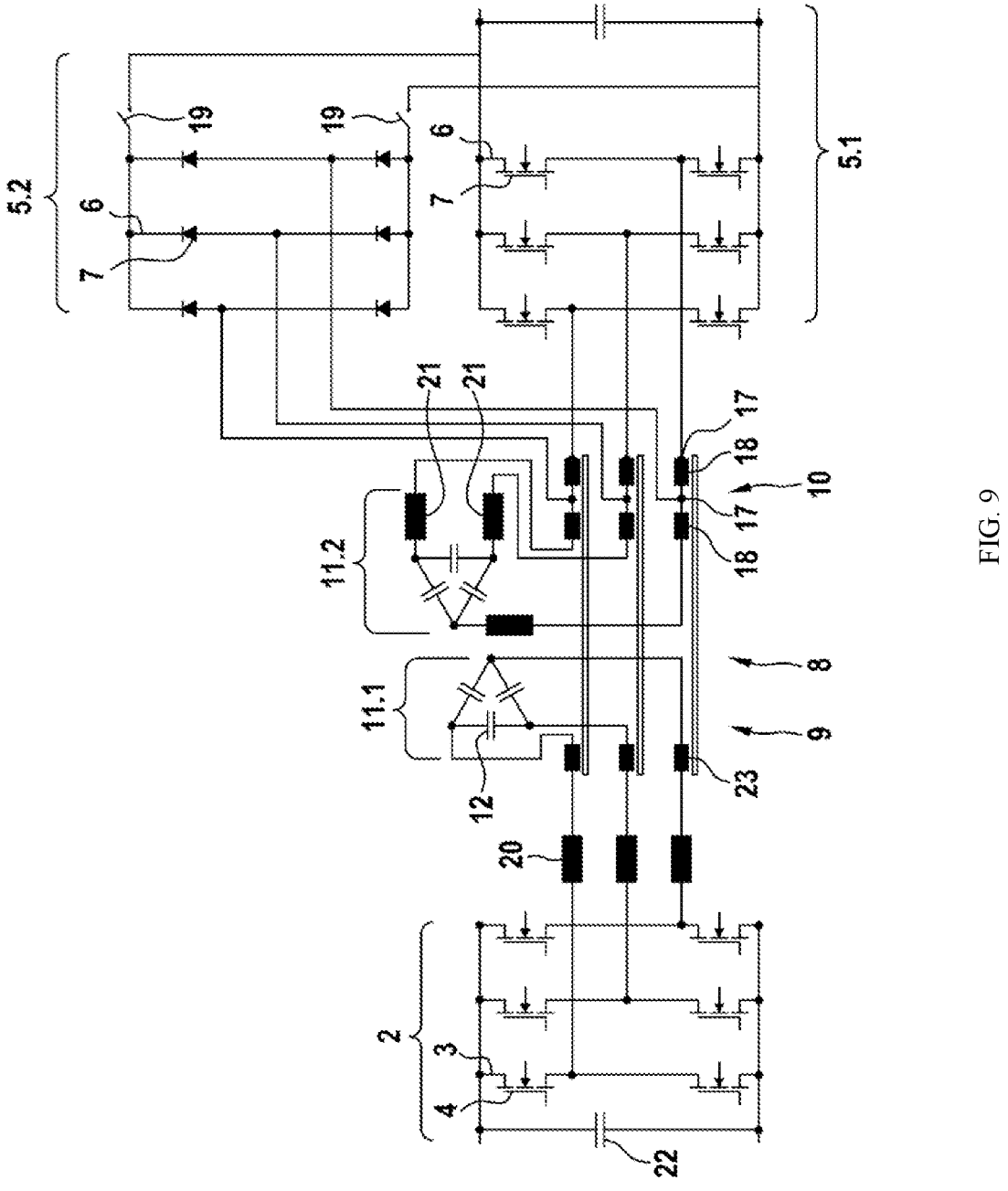
FIG. 9 shows a circuit diagram of a multi-phase DC/DC-converter according to an eighth embodiment of the present application.

FIG. 9 shows a circuit diagram of a multi-phase DC/DC-converter 1 according to an eighth embodiment of the present application.

As shown therein, the converter 1 of the present embodiment is a three phase converter 1. The circuit diagram shown in FIG. 9 is re-arranged as compared to FIGS. 1 to 8 (especially for example FIG. 5) with respect to the primary side 9 and the secondary side 10 of the transformer 8 for higher clarity regarding the differing features of the present embodiment. Essentially, the transformer 8 is shown in a side-to-side layout as compared to an up-down layout shown in FIGS. 1 to 8.

On the primary side 9, the converter 1 includes a first resonant capacitor network 11.1 in a delta configuration.

On the secondary side 10, the converter 1 of the present embodiment includes two secondary side rectifier circuits 5, namely a first secondary side rectifier circuit 5.1 and a second secondary side rectifier circuit 5.2.

As can be taken from FIG. 9, the first secondary side rectifier circuit 5.1 includes switches as rectifier elements 7. Thereby, the first secondary side rectifier circuit 5.1 allows bidirectional operation of the converter 1.

Further, the second secondary side rectifier circuit 5.2 includes diodes as rectifier elements 7. Thereby, the second secondary side rectifier circuit 5.2 allows unidirectional operation of the converter 1 (i.e. non-bidirectional operation of the converter 1). The converter 1 includes rectifier circuit switching units 19 connected to outputs of the first and second secondary side rectifier circuits 5.1, 5.2. The rectifier circuit switching units 19 thereby allow switching between the (use of) first secondary side rectifier circuit 5.1 and the second secondary side rectifier circuit 5.2.

One common application of DC-DC converters is their use in charging batteries of electric vehicles. Therein, commonly, the chargers (or corresponding circuits in the vehicle) include such DC-DC converters in unidirectional configuration, with resonances and circuit parameters set to be close to ideal for charging batteries. However, in recent years, it has become more common to use the charged batteries of electric vehicles to also power other appliances, for example an entire home. Therefore, the charging circuits included in the vehicles have recently been switched to bidirectional configurations. However, bidirectional configurations can commonly only be set (with regard to resonances and circuit parameters) so as to be non-ideal for both charging and discharging applications (and therefore only somewhat ideal for both applications simultaneously).

Therefore, in the present embodiment, the converter 1 includes two secondary side rectifier circuits 5.1, 5.2, one for a bidirectional use (i.e. the first rectifier circuit 5.1) and one for unidirectional use (i.e. the second rectifier circuit 5.2).

Further, in the present embodiment, the second resonant capacitor network 11.2 connected to the secondary side 10 of the transformer is connected between both of the two secondary side rectifier circuits 5.1, 5.2. Therefore, in the present embodiment, the converter 1 includes, on the secondary side 10 of the transformer 8, a single resonant capacitor network 11.2 connected between the secondary side 10 of the transformer 8 and the plurality of, here two, secondary side rectifier circuits 5.1, 5.2.

The transformer 8 includes two secondary windings 18. Each of the secondary side rectifier circuits 5.1, 5.2 is connected to a different tapping 17 of the secondary windings 18. Thereby, an effective turn-ratio is different for each of the secondary side rectifier circuits 5.1, 5.2. Therefore, the configuration of the present embodiment achieves higher efficiency when operating in forward mode (i.e. from primary side 9 to secondary side 10) via the second secondary side rectifier circuit 5.1 than when doing so via the first secondary side rectifier circuit 5.2.

Figure 10:
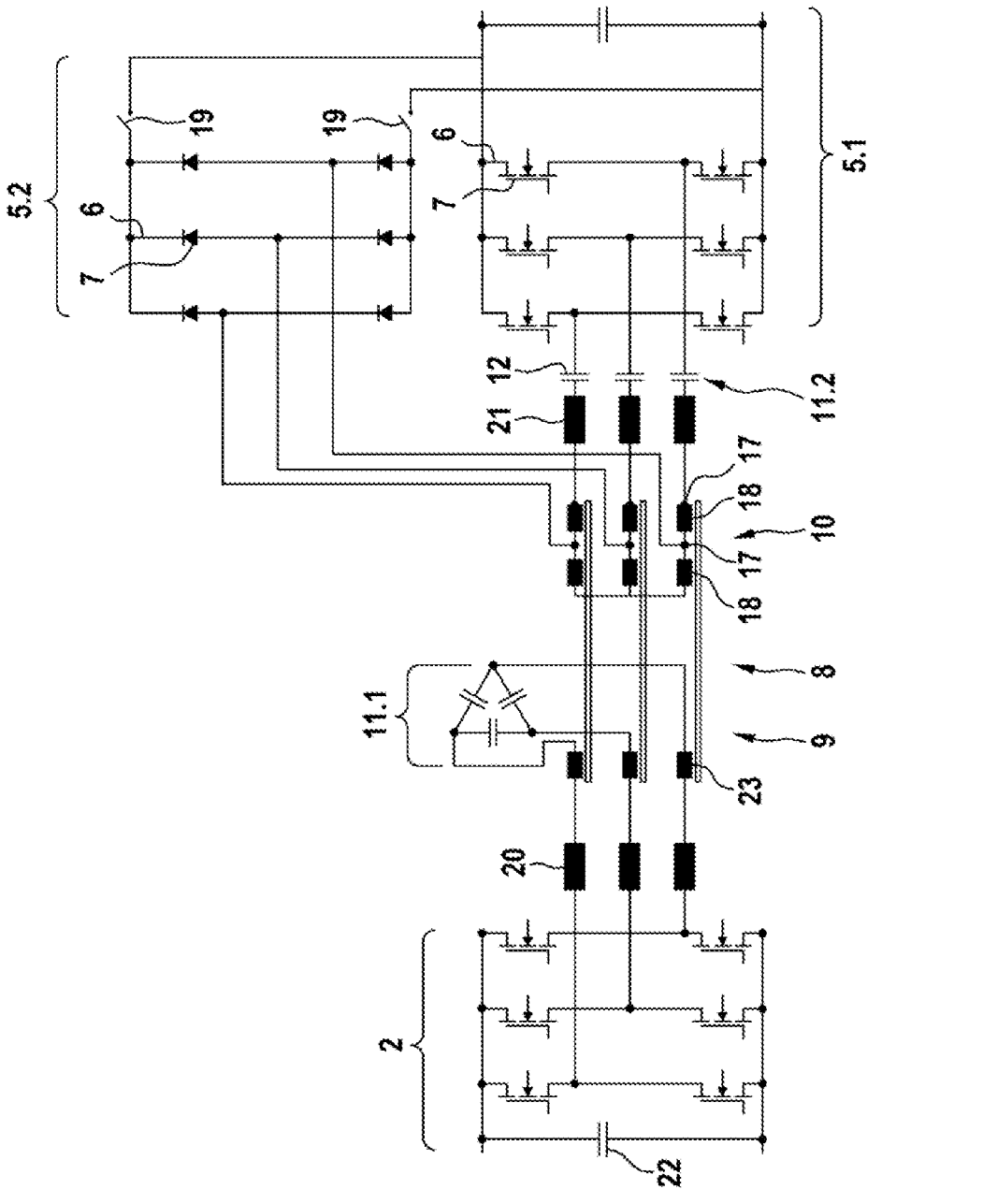
FIG. 10 shows a circuit diagram of a multi-phase DC/DC-converter according to a ninth embodiment of the present application.

FIG. 10 shows a circuit diagram of a multi-phase DC/DC-converter 1 according to a ninth embodiment of the present application.

As can be taken from FIG. 10, the converter 1 of the present embodiment also includes two secondary side rectifier circuits 5.1, 5.2 with the rectifier circuit switching units 19 therebetween, and is a three phase converter.

FIG. 10 shows an example in which the resonant capacitor network 11.2 of the secondary side 10 is connected to only one of the plurality of secondary side rectifier circuits 5.1 or 5.2.

In the present embodiment, the resonant capacitor network 11.2 of the secondary side 10 is connected only to the first secondary side rectifier circuit 5.1, i.e. the bidirectional rectifier circuit.

In addition (i.e. for both rectifier circuits 5.1 and 5.2) or alternatively, there may be a resonant capacitor network (not shown) on the secondary side 10 connected only to the second secondary side rectifier circuit 5.2.

Thereby, in the present embodiment, the converter 1 in an operation mode (charging, forward mode) employing the second secondary side rectifier circuit 5.2 is unaffected by the resonant network 11.2 (in addition to the secondary side resonance inductances 21 connected thereto) for the first secondary side rectifier circuit 5.1. Thereby, each of the operations (forward or backward mode) can be advantageously optimized.

Figure 11:
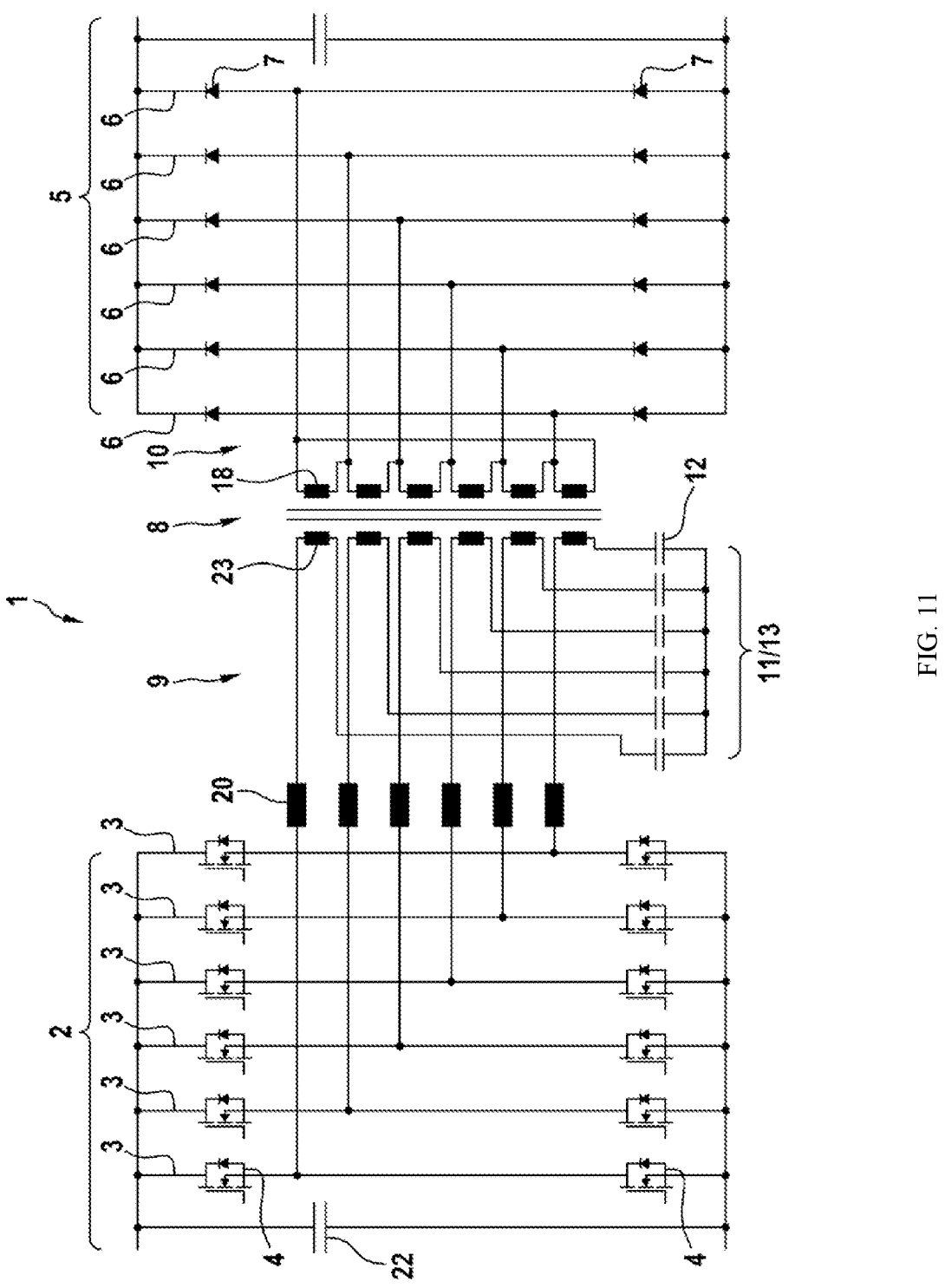
FIG. 11 shows a circuit diagram of a multi-phase DC/DC-converter according to a tenth embodiment of the present application.

FIG. 11 shows a circuit diagram of a multi-phase DC/DC-converter 1 according to a tenth embodiment of the present application.

As can be taken from FIG. 11, the converter 1 of the present embodiment is similar to the converter 1 of the first embodiment in that the capacitors 12 of the resonant capacitor network 11 of the present embodiment also include a double star configuration 13.

In the present embodiment, as can be taken from the circuit diagram, the secondary side 10 of the transformer 8 is connected in a delta configuration.

Thereby, an occurrence of triplen (3, 6, 9, 12, etc.) harmonics is advantageously reduced or prevented.

Such a delta configuration of the secondary side 10 of the transformer 8 may preferably be combined with or employed in any one of the foregoing described embodiments.

Figure 12:
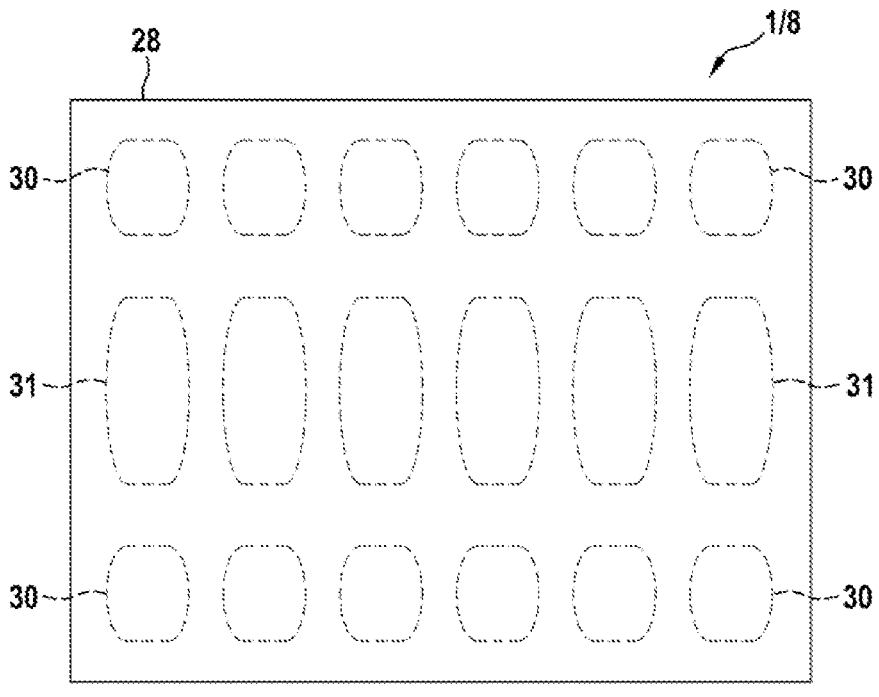
FIG. 12 shows a schematic top view of a transformer included in a multi-phase DC/DC-converter according to an eleventh embodiment of the present application.
Figure 13:
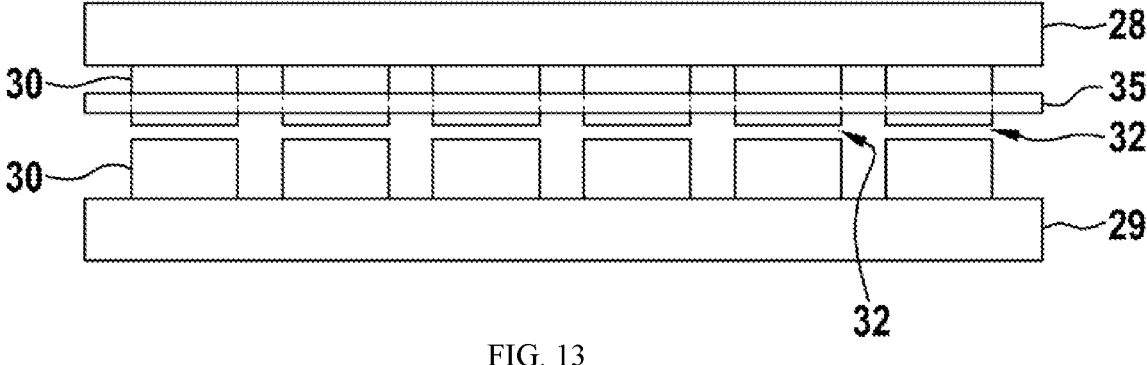
FIG. 13 shows a schematic side view of the transformer included in the multi-phase DC/DC-converter according to the eleventh embodiment of the present application.
Figure 14:
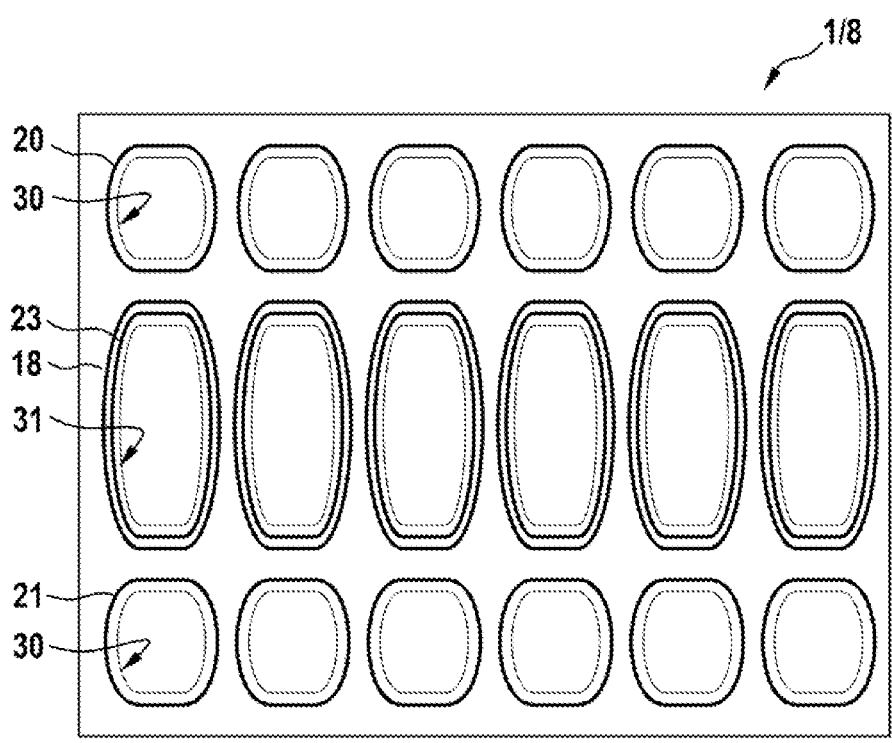
FIG. 14 shows a schematic cross-sectional top view of the transformer included in the multi-phase DC/DC-converter according to the eleventh embodiment of the present application.

FIG. 12 shows a schematic top view of a transformer 8 included in a multi-phase DC/DC-converter 1 according to an eleventh embodiment of the present application. FIG. 13 shows a schematic side view of the transformer 8 of the multi-phase DC/DC-converter 1 according to the eleventh embodiment of the present application. FIG. 14 shows a schematic cross-sectional top view of the transformer 8 of the multi-phase DC/DC-converter 1 according to the tenth embodiment of the present application. In particular, FIGS. 12 to 14 show a detail view of a configuration of the transformer 8 included in the converter 1, especially in any one of the converters 1 of the foregoing embodiments.

As can be taken from FIGS. 12 and 13, the converter 1 includes a planar transformer 8 with integrated primary side resonant inductors 20 and integrated secondary side resonant inductors 21. The converter 1 of FIGS. 12 and 13 is a six phase converter 1 according to any one of the foregoing described embodiments. Therefore, the transformer 8 of FIGS. 12 and 13 is a six phase planar transformer 8.

In FIG. 12, a top view of a top magnetic core 28 is shown. Hashed lines indicate components underneath the top magnetic core 28, and are shown in further detail in FIGS. 13 and 14.

The planar transformer 8 of the present embodiment includes the top magnetic core 28 and a bottom magnetic core 29. Each of the top and bottom magnetic cores 28, 29 includes magnetic core legs 30 and 31. Therein, the magnetic core legs 31 in the middle of FIG. 12 (i.e. in the top view middle of the transformer 8) correspond to magnetic core legs 31 for the transformer windings 18, 23 (i.e. primary/secondary windings 23, 18). In FIG. 13, magnetic core legs 30 can be seen, which correspond to the outer legs 30 on either side of the transformer winding magnetic core legs 31 in FIG. 12. These outer legs 30 correspond to magnetic core legs 30 for resonant inductors 20 and 21 (compare FIGS. 1 to 11).

As can be taken from FIG. 14, in which a cross-section showing the windings of the transformer 8 is demonstrated, the top row of outer magnetic core legs 30 carries the resonant inductors (winding and core leg) 20 of the primary side 9, whereas the bottom row of outer magnetic core legs 30 carries the resonant inductors 21 of the secondary side 10 of the transformer 8.

In particular, as a comparison of FIG. 14 with FIG. 13 shows, the windings of the resonant inductors 20 and 21 and the windings 18 and 23 of the transformer 8 are printed on a printed circuit board 35 (PCB). The PCB 35 includes openings into which the respective core legs 30, 31 are inserted.

Furthermore, between opposing legs (compare FIG. 13), air gaps 32 are provided.

Thereby, the transformer 8 of the converter 1 is formed as a planar transformer 8 with integrated primary side resonant inductors 20 and integrated secondary side resonant inductors 21.

The further components, for example the primary side switching circuit 2 and/or the at least one secondary side rectifier circuit 5 and/or the at least one resonant capacitor network 11 can appropriately also be printed on the PCB 35.

Figure 15:
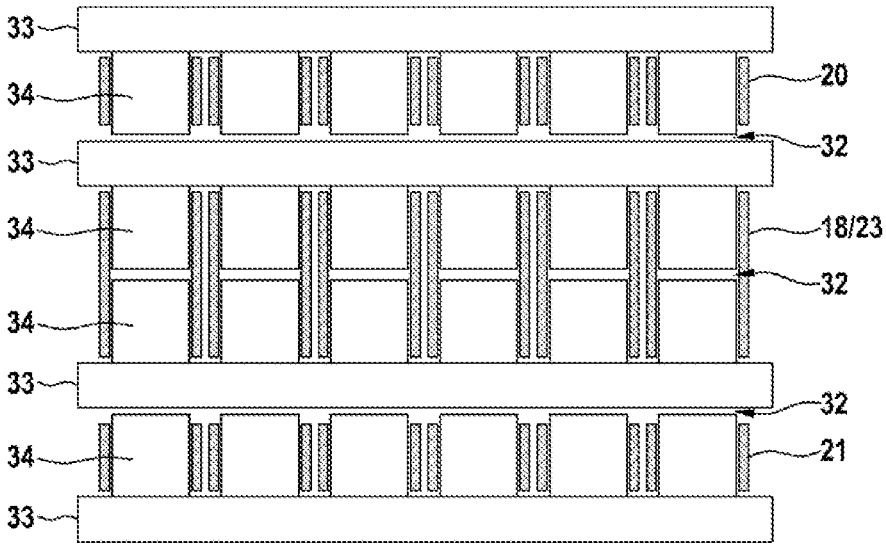
FIG. 15 shows a schematic side view of a transformer included in a multi-phase DC/DC-converter according to a twelfth embodiment of the present application.

FIG. 15 shows a schematic side view of a transformer 8 included in a multi-phase DC/DC-converter 1 according to a twelfth eleventh embodiment of the present application.

As can be taken from FIG. 15, the converter 1 of the present embodiment is a six-phase converter 1, where the transformer 8 is formed in a stacked configuration of cores 33 with legs 34. Therein, the cores 33 are in an EE∃∃ type configuration (the legs of the "E" correspond to magnetic core legs 34, the base of the "E" corresponding to the cores 33). In particular, although not visible in the side view of FIG. 15, the cores 33 are plate-shaped with the legs 34 projecting therefrom. Furthermore, the transformer windings 18, 23 as well as the primary side resonant inductor 20 windings and the secondary side resonant inductor 21 windings are shown. Air gaps 32 are provided therein between opposing legs 34 and between legs 34 and an adjacent core 33.

The foregoing described embodiments may suitably be combined with one another. Where features of the converter 1 were shown with respect to a three-phase converter 1 example, such features can suitably also be implemented in the six-phase converter 1 examples. In particular, embodiments one to ten may be combined with one another and/or with any one of embodiments eleven (planar configuration) and/or twelve (stacked configuration).

In addition to the foregoing written explanations, it is explicitly referred to FIGS. 1 to 15, where the figures in detail show configuration examples of the application. In particular, it is explicitly referred to FIGS. 1 to 5 and 7 to 11, in which circuit diagrams are shown, and from which connection schemes may be taken, especially concerning series and/or parallel connection of elements shown therein.

Further, said circuit diagrams may be understood as describing exact connection schemes, such that two elements directly connected to one another therein, especially electrically, are to be understood as such, especially with no other (active) elements connected therebetween.

What is claimed is:

1. Multi-phase DC/DC-converter, comprising:
   a primary side switching circuit comprising a plurality of primary side switching legs, wherein each primary side switching leg comprises two or more switch elements;
   at least one secondary side rectifier circuit each comprising a plurality of secondary side rectifier legs, wherein each secondary side rectifier leg comprises two or more rectifier elements;
   a transformer, wherein the transformer comprises a primary side connected to the primary side switching circuit and a secondary side connected to each of the at least one secondary side rectifier circuit; and
   at least one resonant capacitor network, each connected to the primary side or to the secondary side of the transformer, wherein each resonant capacitor network comprises a plurality of capacitors;
   wherein the at least one resonant capacitor network comprises a switching unit configured to switch connections of the capacitors of the resonant capacitor network between at least two connection configurations.

2. Multi-phase DC/DC-converter according to claim 1, wherein the at least two connection configurations comprise different gain curves at different frequencies.

3. Multi-phase DC/DC-converter according to claim 1, wherein the at least two connection configurations comprise different circuit parameters of at least a resonance inductance and/or a resonance capacitance.

4. Multi-phase DC/DC-converter according to claim 1, wherein the at least two connection configurations are chosen from: a star configuration, a double star configuration, a hexagonal configuration and a double delta configuration.

5. Multi-phase DC/DC-converter according to claim 4, wherein the at least one resonant capacitor network comprises two different connection configurations out of the double star configuration, the hexagonal configuration, and the double delta configuration, and the switching unit is configured to switch between said two connection configurations.

6. Multi-phase DC/DC-converter according to claim 1, wherein each of the at least one resonant capacitor network is respectively connected between the primary side switching circuit and the primary side of the transformer or between the respective secondary side rectifier circuit and the secondary side of the transformer.

7. Multi-phase DC/DC-converter according to claim 6, wherein the multi-phase DC/DC-converter is unidirectional, and the two or more rectifier elements are diodes; and the resonant capacitor network is connected between the primary side switching circuit and the primary side of the transformer.

8. Multi-phase DC/DC-converter (1) according to claim 6, wherein the multi-phase DC/DC-converter is bidirectional and the two or more rectifier elements are switching elements, and wherein the multi-phase DC/DC-converter comprises a first resonant capacitor network connected between the primary side switching circuit and the primary side of the transformer, and a second resonant capacitor network connected between the respective secondary side rectifier circuit and the secondary side of the transformer.

9. Multi-phase DC/DC-converter according to claim 8, wherein the switch units of the first resonant capacitor network and the second resonant capacitor network are configured to switch the connection configurations independently from each other.

10. Multi-phase DC/DC-converter according to claim 1, wherein the multi-phase DC/DC-converter comprises a plurality of secondary side rectifier circuits, wherein each of the secondary side rectifier circuits is connected to a different tapping of windings of the secondary side of the transformer.

11. Multi-phase DC/DC-converter according to claim 10, further comprising a first secondary side rectifier circuit and a second secondary side rectifier circuit, wherein the rectifier elements of the first secondary side rectifier circuit are switches as and the rectifier elements of the second secondary side rectifier circuit are diodes.

12. Multi-phase DC/DC-converter according to claim 11, further comprising at least one rectifier circuit switching unit connected to the output side of the rectifier elements of one or both of the first secondary side rectifier circuit and the second secondary side rectifier circuit, and the rectifier circuit switching unit is configured to switch between the first secondary side rectifier circuit and the second secondary side rectifier circuits.

13. Multi-phase DC/DC-converter according to claim 10, wherein the multi-phase DC/DC-converter further comprises, on the secondary side of the transformer, a single resonant capacitor network connected between the secondary side of the transformer and at least one of the plurality of secondary side rectifier circuits.

14. Multi-phase DC/DC-converter according to claim 13, wherein the single resonant capacitor network on the secondary side of the transformer is connected between the secondary side of the transformer and only one of the plurality of secondary side rectifier circuits.

15. Multi-phase DC/DC-converter according to claim 14, wherein the single resonant capacitor network on the secondary side of the transformer is connected between the secondary side of the transformer and a first secondary side rectifier circuit, and wherein the rectifier elements of the first secondary side rectifier circuit are switches.

16. Multi-phase DC/DC-converter according to claim 13, wherein the single resonant capacitor network comprises a switching unit configured to switch connections of the capacitors of the resonant capacitor network between at least two connection configurations.

17. Multi-phase DC/DC-converter according to claim 16, wherein the at least two connection configurations are chosen from: a star configuration, a double star configuration, a hexagonal configuration and a double delta configuration.

18. Multi-phase DC/DC-converter according to claim 1, wherein the multi-phase DC/DC-converter is a six phase DC/DC-converter, the primary side switching circuit comprises six primary side switching legs, and each of the at least one secondary side rectifier circuit comprises six secondary side rectifier legs.

19. Multi-phase DC/DC-converter according to claim 1, wherein the transformer is planar, and comprises at least one of integrated primary side resonant inductors and secondary side resonant inductors.

\* \* \* \* \*